United States Patent
Oki et al.

(10) Patent No.: US 12,347,855 B2
(45) Date of Patent: Jul. 1, 2025

(54) NEGATIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Yukihiro Oki, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 551 days.

(21) Appl. No.: 17/763,969

(22) PCT Filed: Sep. 29, 2020

(86) PCT No.: PCT/JP2020/036802
§ 371 (c)(1),
(2) Date: Mar. 25, 2022

(87) PCT Pub. No.: WO2021/065862
PCT Pub. Date: Apr. 8, 2021

(65) Prior Publication Data
US 2022/0344650 A1 Oct. 27, 2022

(30) Foreign Application Priority Data
Sep. 30, 2019 (JP) ................................. 2019-178617

(51) Int. Cl.
*H01M 4/40* (2006.01)
*H01M 4/42* (2006.01)
*H01M 4/02* (2006.01)

(52) U.S. Cl.
CPC ........ *H01M 4/42* (2013.01); *H01M 2004/027* (2013.01)

(58) Field of Classification Search
CPC .......................... H01M 4/42; H01M 2004/027
See application file for complete search history.

(56) References Cited

U.S. PATENT DOCUMENTS 5,425,913 A    6/1995   Strauven et al.
5,626,983 A *   5/1997   Ekern .................. H01M 4/628
                                                                                                      429/169
(Continued)

FOREIGN PATENT DOCUMENTS

CN     102347469 A   *   2/2012
CN     102447129 A      5/2012
(Continued)

OTHER PUBLICATIONS

International Search Report dated Dec. 8, 2020, issued in counterpart International application No. PCT/JP2020/036802, with English translation. (5 pages).
(Continued)

*Primary Examiner* — Maria Laios
*Assistant Examiner* — Ziheng Lu
(74) *Attorney, Agent, or Firm* — WHDA, LLP

(57) ABSTRACT

A nonaqueous electrolyte secondary battery according to the present invention is provided with a negative electrode, a positive electrode and a nonaqueous electrolyte. A negative electrode active material contained in the negative electrode contains a zinc manganese alloy containing Zn, Mn and Fe that is in an amount of 1,000 ppm or less of the total mass of Zn and Mn. With respect to the zinc manganese alloy, the molar ratio of the Zn content to the Mn content is from 3 to 13.

3 Claims, 1 Drawing Sheet

(56) References Cited

U.S. PATENT DOCUMENTS

| | | | |
|---|---|---|---|
| 6,338,916 B1 | | 1/2002 | Irie et al. |
| 2012/0082896 A1 | | 4/2012 | Takahashi et al. |

FOREIGN PATENT DOCUMENTS

| | | | | |
|---|---|---|---|---|
| CN | 105206879 | A | * | 12/2015 |
| JP | 61-51764 | A | | 3/1986 |
| JP | 5-125470 | A | | 5/1993 |
| JP | 2000-228191 | A | | 8/2000 |
| JP | 2012-79470 | A | | 4/2012 |
| JP | 2013-51170 | A | | 3/2013 |

OTHER PUBLICATIONS

Office Action dated Dec. 14, 2024, issued in counterpart CN Application No. 202080067991.9, with partial English translation. (11 pages).

* cited by examiner

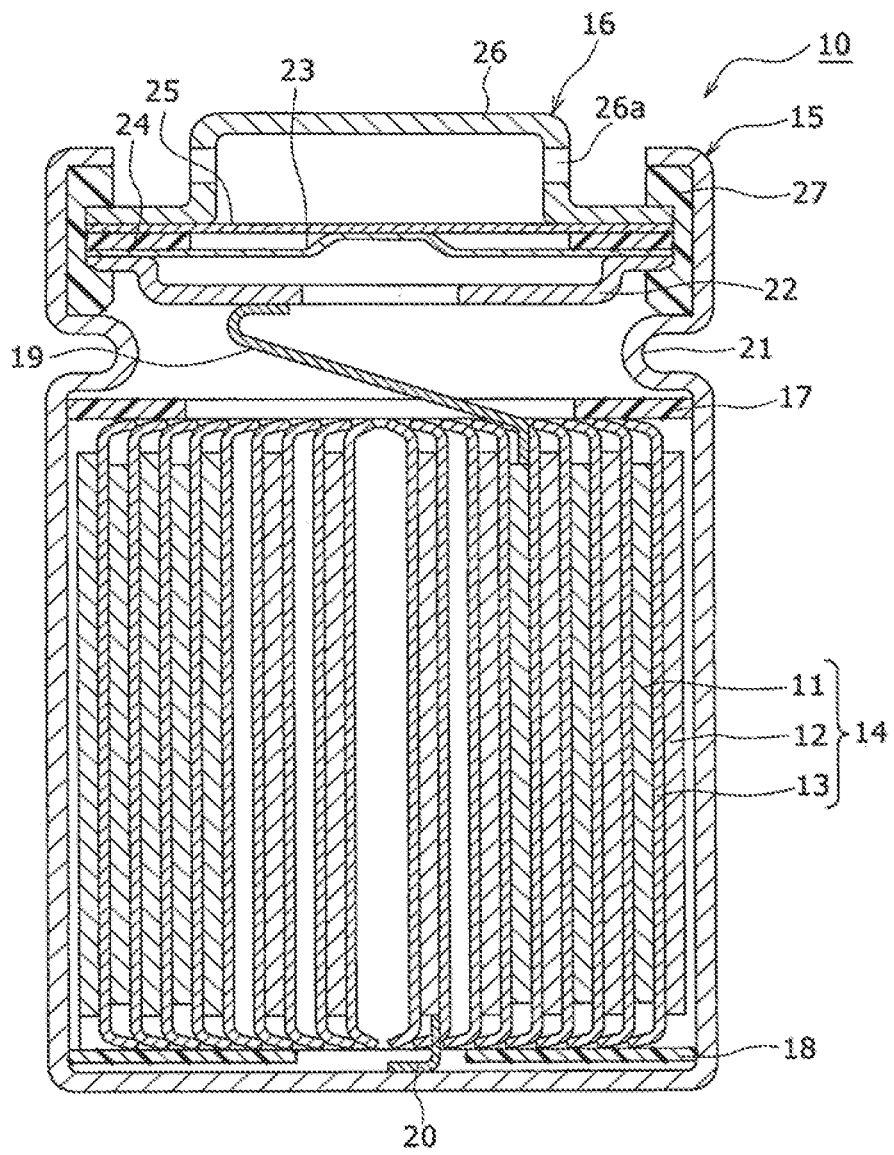

NEGATIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATIONS

This application is a national stage of International Application No. PCT/JP2020/036802, filed Sep. 29, 2020, which claims priority to Japanese Patent Application No. 2019-178617filed Sep. 30, 2019 both of which are hereby incorporated by reference in their entirety.

TECHNICAL FIELD

The present disclosure generally relates to a negative electrode active material for a non-aqueous electrolyte secondary battery, and to a non-aqueous electrolyte secondary battery.

BACKGROUND ART

As a negative electrode active material for a secondary battery with a high capacity, alloys including elements other than Si have been investigated. For the purpose of increasing the capacity of secondary batteries and improving charge-discharge cycle characteristics, Patent Literature 1 discloses TiZn and Patent Literature 2 discloses NiZn, CuZn, and FeZn.

CITATION LIST

Patent Literature

PATENT LITERATURE 1: Japanese Unexamined Patent Application Publication No. 2012-79470

PATENT LITERATURE 2: Japanese Unexamined Patent Application Publication No. 2013-51170

SUMMARY

The secondary batteries using zinc alloys as the negative electrode mixture layer disclosed in Patent Literature 1 and Patent Literature 2 have been found to give an insufficient discharge capacity based on a charge capacity at the first cycle of charge and discharge, and to have a low initial charge-discharge efficiency.

A negative electrode active material for a non-aqueous electrolyte secondary battery of an aspect of the present disclosure includes a zinc-manganese alloy containing Zn, Mn, and 1000 ppm or less of Fe based on a total mass of Zn and Mn. In the zinc-manganese alloy, a molar ratio of a Zn content to a Mn content is 3 to 13.

A non-aqueous electrolyte secondary battery of an aspect of the present disclosure comprises: a negative electrode including the negative electrode active material for a non-aqueous electrolyte secondary battery; a positive electrode; and a non-aqueous electrolyte.

According to an aspect of the present disclosure, the initial charge-discharge efficiency of the secondary battery may be increased, and thereby the discharge capacity may be increased even during and after the second cycle.

BRIEF DESCRIPTION OF DRAWING

FIG. 1 is a longitudinal sectional view of a non-aqueous electrolyte secondary battery of an example of an embodiment.

DESCRIPTION OF EMBODIMENTS

A negative electrode active material in which Si is mixed with a graphite is used for the purpose of increasing the capacity of secondary batteries. Unfortunately, Si is expensive and incorporating Si may deteriorate cycle characteristics of secondary batteries, and therefore alloys including elements other than Si have attracted attention as a negative electrode active material. For example, for the purpose of increasing the capacity of secondary batteries and improving charge-discharge cycle characteristics, Patent Literature 1 discloses TiZn and Patent Literature 2 discloses NiZn, CuZn, and FeZn. However, through the investigation, the present inventors have found that the secondary batteries using the zinc alloys as the negative electrode mixture layer disclosed in Patent Literature 1 and Patent Literature 2 give an insufficient discharge capacity based on a charge capacity at the first cycle of charge and discharge, and have a low initial charge-discharge efficiency, whereas a zinc-manganese alloy according to the present disclosure has a high initial charge-discharge efficiency and may increase the discharge capacity even during and after the second cycle. During the charge, the zinc-manganese alloy in which a molar ratio of a Zn content to a Mn content is 3 to 13 occludes Li, and Zn and Li are bonded to form LiZn. During the discharge, Zn and Mn are recombined to release Li. Since the zinc-manganese alloy has a lower melting point than other zinc alloys such as TiZn, NiZn, CuZn, and FeZn, Mn is considered to easily move in Zn, and it is presumed that Li occluded in a negative electrode during the first cycle may be efficiently released with discharging. It has also been found that incorporating 1000 ppm or less of Fe in the zinc-manganese alloy may further increase the initial efficiency of the zinc-manganese alloy. Fe forms a fine cluster alloy of FeMn, FeZn, or FeMnZn, which is independent of occluding and releasing of Li, in the zinc-manganese alloy. Thus, the cluster alloy functions as a core during a recrystallization of Mn and Zn, the separated Mn and Zn are presumed to be easily recombined to increase the initial efficiency.

Hereinafter, an example of an embodiment of a negative electrode active material for a non-aqueous electrolyte secondary battery according to the present disclosure and a non-aqueous electrolyte secondary battery using the negative electrode active material will be described in detail. Hereinafter, a cylindrical battery in which a wound electrode assembly is housed in a bottomed cylindrical exterior housing can will be exemplified, but an exterior housing body is not limited to a cylindrical exterior housing can, and may be, for example, a rectangular exterior housing can, and may also be an exterior housing body constituted of laminated sheets including a metal layer and a resin layer. The electrode assembly may be a stacked electrode assembly in which a plurality of positive electrodes and a plurality of negative electrodes are alternately stacked with separators interposed therebetween.

FIG. 1 is a longitudinal sectional view of a cylindrical secondary battery 10 of an example of an embodiment. In the secondary battery 10 illustrated in FIG. 1, an electrode assembly 14 and a non-aqueous electrolyte (not illustrated) are housed in an exterior housing body 15. The electrode assembly 14 has a wound structure in which a positive electrode 11 and a negative electrode 12 are wound with a separator 13 interposed therebetween. For a non-aqueous solvent of the non-aqueous electrolyte (organic solvent), carbonates, lactones, ethers, ketones, esters, and the like may be used, and two or more of these solvents may be mixed to be used. When two or more solvents are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. For an electrolyte salt in the non-aqueous electrolyte, $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L. Hereinafter, for convenience of description, the sealing assembly 16 side will be described as "the upper side", and the bottom side of the exterior housing body 15 will be described as "the lower side".

An opening end of the exterior housing body 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and welded to the lower face of a filter 22, which is a bottom plate of the sealing assembly 16. In the secondary battery 10, a cap 26, which is a top plate of the sealing assembly 16 electrically connected to the filter 22, becomes a positive electrode terminal. A negative electrode lead 20 extends through a through hole of the insulating plate 18 toward the bottom side of the exterior housing body 15, and welded to a bottom inner face of the exterior housing body 15. In the secondary battery 10, the exterior housing body 15 becomes a negative electrode terminal. When the negative electrode lead 20 is provided on the terminal end part, the negative electrode lead 20 extends through an outside of the insulating plate 18 toward the bottom side of the exterior housing body 15, and welded to the bottom inner face of the exterior housing body 15.

The exterior housing body 15 is, for example, a bottomed cylindrical metallic exterior housing can. A gasket 27 is provided between the exterior housing body 15 and the sealing assembly 16 to achieve sealability inside the secondary battery 10. The exterior housing body 15 has a grooved part 21 formed by, for example, pressing the side part thereof from the outside to support the sealing assembly 16. The grooved part 21 is preferably formed in a circular shape along a circumferential direction of the exterior housing body 15, and supports the sealing assembly 16 with the gasket 27 interposed therebetween and with the upper face of the grooved part 21.

The sealing assembly 16 has the filter 22, a lower vent member 23, an insulating member 24, an upper vent member 25, and the cap 26 which are stacked in this order from the electrode assembly 14 side. Each member constituting the sealing assembly 16 has, for example, a disk shape or a ring shape, and each member except for the insulating member 24 is electrically connected each other. The lower vent member 23 and the upper vent member 25 are connected each other at each of central parts thereof, and the insulating member 24 is interposed between each of the circumferential parts of the vent members 23 and 25. If the internal pressure of the battery increases due to abnormal heat generation, for example, the lower vent member 23 breaks and thereby the upper vent member 25 expands toward the cap 26 side to be separated from the lower vent member 23, resulting in cutting off of an electrical connection between both the members. If the internal pressure further increases, the upper vent member 25 breaks, and gas is discharged through an opening 26a of the cap 26.

Hereinafter, the positive electrode 11, negative electrode 12, and separator 13, which constitute the electrode assembly 14, particularly the negative electrode active material constituting the negative electrode 12 will be described in detail.

[Positive Electrode]

The positive electrode 11 has a positive electrode core body and a positive electrode mixture layer provided on a surface of the positive electrode core body. For the positive electrode core body, a foil of a metal stable within a potential range of the positive electrode 11, such as aluminum, a film in which such a metal is disposed on a surface layer thereof, and the like may be used. A thickness of the positive electrode core body is, for example, 10 μm to 30 μm. The positive electrode mixture layer includes a positive electrode active material, a binder, and a conductive agent, and is preferably provided on both surfaces of the positive electrode core body except for a portion to which the positive electrode lead 19 is connected. The positive electrode 11 may be produced by, for example, applying a positive electrode mixture slurry including the positive electrode active material, the binder, the conductive agent, and the like on the surface of the positive electrode core body, drying and subsequently compressing the applied film to form the positive electrode mixture layer on both the surfaces of the positive electrode core body.

The positive electrode active material includes a lithium-transition metal oxide as a main component. The positive electrode active material may be constituted of substantially only the lithium-transition metal oxide, and particles of an inorganic compound, such as aluminum oxide and a lanthanoid-containing compound, may be adhered to a particle surface of the lithium-transition metal oxide. The lithium-transition metal oxide may be used singly, or may be used in combination of two or more thereof.

Examples of a metal element contained in the lithium-transition metal oxide include nickel (Ni), cobalt (Co), manganese (Mn), aluminum (Al), boron (B), magnesium (Mg), titanium (Ti), vanadium (V), chromium (Cr), iron (Fe), copper (Cu), zinc (Zn), gallium (Ga), strontium (Sr), zirconium (Zr), niobium (Nb), indium (In), tin (Sn), tantalum (Ta), and tungsten (W). A preferable example of the lithium-transition metal oxide is a composite oxide represented by the general formula: $Li_\alpha Ni_x M_{(1-x)}O_2$ ($0.1 \leq \alpha \leq 1.2$, $0.3 \leq x < 1$, and M includes at least one of the group consisting of Co, Mn, and Al).

Examples of the conductive agent included in the positive electrode mixture layer may include carbon materials such as carbon black, acetylene black, Ketjenblack, carbon nanotube, carbon nanofiber, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide resin, an acrylic resin, and a polyolefin resin. With these resins, cellulose derivatives such as carboxymethyl cellulose (CMC) or a salt thereof, polyethylene oxide (PEO), and the like may be used in combination.

[Negative Electrode]

The negative electrode 12 has a negative electrode core body and a negative electrode mixture layer provided on a surface of the negative electrode core body. For the negative electrode core body, a foil of a metal stable within a potential range of the negative electrode 12, such as copper, a film in which such a metal is disposed on a surface layer thereof, and the like may be used. A thickness of the negative electrode core body is, for example, 5 μm to 15 μm. The negative electrode mixture layer includes a negative electrode active material and a binder, and is preferably provided on, for example, both surfaces of the negative electrode core body except for a portion to which the negative electrode lead 20 is connected. The negative electrode 12 may be produced by, for example, applying a negative electrode mixture slurry including the negative electrode active material, the binder, and the like on the surface of the negative electrode core body, drying and subsequently compressing the applied film to form the negative electrode mixture layer on both the surfaces of the negative electrode core body. A conductive agent may be added into the negative electrode mixture slurry. The conductive agent may uniform a conductive path.

For the binder included in the negative electrode mixture layer, a fluororesin, PAN, a polyimide resin, an acrylic resin, a polyolefin resin, and the like may be used similar to that in the positive electrode 11. When the mixture slurry is prepared by using an aqueous solvent, CMC or a salt thereof, styrene-butadiene rubber (SBR), polyacrylic acid (PAA) or a salt thereof, polyvinyl alcohol, and the like are preferably used. Examples of the conductive agent included in the negative electrode mixture layer may include carbon black, acetylene black, Ketjenblack, carbon nanotube, and carbon nanofiber.

The negative electrode active material includes a zinc-manganese alloy containing Zn, Mn, and 1000 ppm or less of Fe based on a total mass of Zn and Mn. In the zinc-manganese alloy, a molar ratio of a Zn content to a Mn content ($M_{Zn}/M_{Mn}$) is 3 to 13. Containing a small amount of Fe and having $M_{Zn}/M_{Mn}$ within this range may increase the initial charge-discharge efficiency of the secondary battery. $M_{Zn}/M_{Mn}$ is more preferably 6 to 10. A Fe content in the zinc-manganese alloy is preferably 10 ppm or more, and more preferably 50 ppm or more. A Fe content of 10 ppm or more allows Fe to form the fine cluster with Mn and/or Zn and to function as a core for enhancing the recombination. A Fe content in the zinc-manganese alloy of more than 1000 ppm forms a large amount of intermetallic compound of FeZn, which does not contribute to the occlusion and release of Li, resulting in decreased discharge capacity of the battery. The zinc-manganese alloy may contain impurity elements such as Ca, Mg, Si, and Cd, which are present in a raw material or mixed during the manufacturing process. A content of the impurity elements is preferably 500 ppm or less, more preferably 100 ppm or less, and particularly preferably 50 ppm or less. Fe may be mixed as the impurity element, and the raw material powder of Zn or Mn may include Fe. The content of each element contained in the negative electrode active material are measured by inductively coupled plasma (ICP) atomic emission spectroscopic analysis.

The zinc-manganese alloy may have, for example, a γ-phase having a $MnZn_4$ structure, a δ-phase having a $MnZn_9$ structure, and a ζ-phase having a $MnZn_{13}$ structure. The ζ-phase, which is electrochemically active, particularly contributes to the increase in charge-discharge efficiency. The zinc-manganese alloy may include a phase other than the γ-phase, the δ-phase, and the ζ-phase, and may include, for example, an amorphous part. The negative electrode active material may be used singly, or may be used in combination of two or more thereof. As the zinc-manganese alloy, only one type of alloy having single $M_{Zn}/M_{Mn}$ and Fe contents may be used, or two or more types of alloy having different $M_{Zn}/M_{Mn}$ or Fe contents may be mixed to be used, for example. The zinc-manganese alloy may be used in combination with a negative electrode active material other than the zinc-manganese alloy. The negative electrode active material other than the zinc-manganese alloy is not particularly limited as long as it may reversibly occlude and release lithium ions, and for example, a graphite (natural graphite or artificial graphite), metals to form an alloy with lithium such as silicon (Si) and tin (Sn), oxides including a metal element such as Si and Sn, or the like may be used.

The zinc-manganese alloy is particles having a median diameter (D50) on a volumetric basis of, for example, 1 μm or larger and 100 μm or smaller, preferably 50 μm or smaller, and particularly preferably 30 μm or smaller. The zinc-manganese alloy preferably has a smaller D50 because such a D50 shortens a moving distance of Li in the particles. The D50 of the zinc-manganese alloy may be reduced by crushing the alloy with a ball mill. The D50, also referred to as a median diameter, means a particle diameter at which a cumulative frequency is 50% from a smaller particle diameter side in a particle size distribution on a volumetric basis. The particle size distribution of the lithium-transition metal oxide may be measured by using a laser diffraction-type particle size distribution measuring device (for example, MT3000II, manufactured by MicrotracBEL Corp.) with water as a dispersion medium.

The zinc-manganese alloy may be produced by mixing Zn, Mn and Fe at a desired ratio to form a pellet, and then heat-treating and subsequently crushing the pellet. For example, a temperature of the heat treatment is 200° C. to 600° C., and a time of the heat treatment is 0.5 hours to 12 hours.

The negative electrode active material preferably further includes a graphite in addition to the above zinc-manganese alloy, and a proportion of the zinc-manganese alloy based on the number of moles of the graphite is preferably 3 mol % to 30 mol %. The combination of the graphite and the zinc-manganese alloy at this proportion allows the graphite to form a space in the negative electrode mixture layer, resulting in permeation of the electrolyte into the negative electrode core body, and allows the zinc-manganese alloy to increase the battery capacity.

A method for manufacturing the negative electrode 12 is not particularly limited as long as the zinc-manganese alloy containing Zn, Mn, and 1000 ppm or less of Fe based on a total mass of Zn and Mn may be included as the negative electrode active material. The method may include, as described above, applying the negative electrode mixture slurry and drying the applied film to form the negative electrode mixture layer. Another method may include, for example, plating the surface of the negative electrode core body with a Mn—Zn alloy to form the zinc-manganese alloy on the surface, and performing heat treatment if necessary. For example, a temperature of the heat treatment is 200° C. to 600° C., and a time of the heat treatment is 1 minute to 60 minutes. In this case, the Mn—Zn alloy plating layer becomes the negative electrode mixture layer. Graphite may be stacked on a surface of the Mn—Zn alloy plating layer.

[Separator]

For the separator 13, a porous sheet having an ion permeation property and an insulation property is used.

Specific examples of the porous sheet include a fine porous film, a woven fabric, and a nonwoven fabric. A preferable material of the separator 13 is polyolefin resins such as polyethylene and polypropylene, cellulose, and the like. The separator 13 may have any of a single-layered structure and a multilayered structure. On a surface of the separator 13, a heat-resistant layer including a heat-resistant material may be formed. Examples of the heat-resistant material may include polyamide resins such as an aliphatic polyamide and an aromatic polyamide (aramid), and polyimide resins such as a polyamideimide and a polyimide.

EXAMPLES

The present disclosure will be further described below with Examples, but the present disclosure is not limited to these Examples.

Example

[Synthesis of Negative Electrode Active Material]

Mn, Zn, and Fe were used as raw material powders. Mn and Zn were mixed at a molar ratio of Mn:Zn=1:10, and 50 ppm of Fe based on a total mass of Zn and Mn was further mixed therewith. The mixed powder was pelletized, and then heat-treated at 400° C. for 6 hours to produce a zinc-manganese alloy pellet. The produced zinc-manganese alloy pellet was crushed to obtain a zinc-manganese alloy having a median diameter (D50) on a volumetric basis of 20 μm. ICP analysis demonstrated that the zinc-manganese alloy had a composition in which a molar ratio of the Zn content to the Mn content is 10 and the Fe content is 50 ppm based on a total mass of Zn and Mn.

[Production of Negative Electrode]

Then, the obtained zinc-manganese alloy, acetylene black as the conductive agent, and polyvinylidene fluoride as the binder were prepared at a mass ratio of 92:5:3, and kneaded with a N-methyl-2-pyrrolidone (NMP) solution to prepare a slurry. This slurry was applied on a negative electrode core body made of aluminum having a thickness of 15 μm, and dried the applied film in an electric furnace maintained at 100° C. to form a negative electrode active material layer. After the drying, the layer was rolled with a roller, and punched to produce a pellet-shaped electrode.

[Production of Counter Electrode]

To evaluate characteristics of the negative electrode active material for a lithium-ion secondary battery, not the positive electrode but lithium metal (Li) was used as a counter electrode. Common lithium-ion secondary batteries use a lithium-transition metal oxide (typically including transition metals such as Co, Mn, and Ni) such as $LiNiO_2$ for the positive electrode active material. However, to evaluate characteristics of the negative electrode active material itself that is independent of the positive electrode active material, not a commonly used positive electrode active material for electrodes but a punched lithium metal foil was used as the counter electrode, here. Such a method is commonly used for evaluating an active material.

[Production of Non-Aqueous Electrolyte]

Into a mixed non-aqueous solvent of ethylene carbonate (EC) and ethyl methyl carbonate (EMC) at a volume ratio of 1:3, $LiPF_6$ as the electrolyte salt was dissolved at 1.0 mol/L to prepare a non-aqueous electrolyte liquid, which is a liquid non-aqueous electrolyte.

[Production of Battery]

A coin-shaped lithium-ion secondary battery (hereinafter, referred to as coin-shaped battery) was produced with the following procedure by using the produced negative electrode and non-aqueous electrolyte liquid as above. The lithium metal foil, which was to be the counter electrode, was adhered to the inside of a bottom part of a coin-shaped battery exterior housing body made of steel and composed of a lid part and the bottom part, and on the foil, a fine porous film separator made of polyethylene and impregnated with the electrolyte liquid, the negative electrode, a disk-shaped patch made of steel, and a disk spring were disposed and housed in this order. Then, the lid part was set and caulked with the battery exterior housing body for sealing to obtain a coin-shaped battery.

Comparative Example

A non-aqueous electrolyte secondary battery was produced in the same manner as in Example except that: Mn and Zn were used as the raw material powders; and $MnZn_{10}$ that had been produced by mixing the raw material powders at a molar ratio of Mn:Zn=1:10 for pelletizing to be heat-treated at 400° C. for 6 hours was crushed to obtain $MnZn_{10}$ having a median diameter (D50) on a volumetric basis of 20 μm.

Reference Example 1

A non-aqueous electrolyte secondary battery was produced in the same manner as in Example except that: only Zn was used as the raw material powders; and Zn that had been produced by pelletizing the raw material powders to be heat-treated at 400° C. for 6 hours was crushed to obtain Zn having a median diameter (D50) on a volumetric basis of 20 μm.

Reference Example 2

A non-aqueous electrolyte secondary battery was produced in the same manner as in Example except that: Ti and Zn were used as the raw material powders; and $TiZn_{10}$ that had been produced by mixing the raw material powders at a molar ratio of Ti:Zn=1:10 for pelletizing to heat-treated at 415° C. for 12 hours was crushed to obtain $TiZn_{10}$ having a median diameter (D50) on a volumetric basis of 20 μm.

Reference Example 3

A non-aqueous electrolyte secondary battery was produced in the same manner as in Example except that: Co and Zn were used as the raw material powders; and $CoZn_{10}$ that had been produced by mixing the raw material powders at a molar ratio of Co:Zn=1:10 for pelletizing to be heat-treated at 415° C. for 12 hours was crushed to obtain $CoZn_{10}$ having a median diameter (D50) on a volumetric basis of 20 μm.

Reference Example 4

A non-aqueous electrolyte secondary battery was produced in the same manner as in Example except that: Ni and Zn were used as the raw material powders; and $NiZn_{10}$ that had been produced by mixing the raw material powders at a molar ratio of Ni:Zn=1:10 for pelletizing to be heat-treated at 415° C. for 12 hours was crushed to obtain $NiZn_{10}$ having a median diameter (D50) on a volumetric basis of 20 μm.

Reference Example 5

A non-aqueous electrolyte secondary battery was produced in the same manner as in Example except that: Cu and Zn were used as the raw material powders; and $CuZn_{10}$ that had been produced by mixing the raw material powders at a molar ratio of Cu:Zn=1:10 for pelletizing to be heat-treated at 415° C. for 12 hours was crushed to obtain $CuZn_{10}$ having a median diameter (D50) on a volumetric basis of 20 μm.

Performance of each of the coin-shaped batteries was evaluated with the following method. The evaluation results are shown in Table 1. Table 1 shows compositions of the negative electrode active materials as well as the evaluation results.

[Evaluation of Initial Efficiency]

On each of the coin-shaped batteries of Example, Comparative Example, and Reference Examples 1 to 5, an initial charge capacity and an initial discharge capacity were measured to evaluate an initial efficiency. Here, the discharge is referred to a discharge of a battery having a combination of the negative electrode active materials of Example, Comparative Example and Reference Examples 1 to 5 and a commonly used positive electrode such as $LiNiO_2$. The above discharge, which generally should be referred to as a charge since the coin-shaped battery has the negative electrode as a working electrode and the lithium metal (Li) as the counter electrode, is represented with a reverse charge-discharge direction for consisting with a charge-discharge behavior of a negative electrode of a battery having a combination of commonly used positive electrode and negative electrode. In other words, the charge is referred to supply of a current for decreasing a potential of a negative electrode being a working electrode, and the discharge is referred to supply of a current for increasing the potential of the negative electrode being the working electrode.

First, the battery was charged at a constant current of 0.05 C until a battery voltage reached 0 V, and then discharged at a constant current of 0.05 C until the battery voltage reached 1 V to measure the initial charge capacity and the initial discharge capacity. As described above, the charge and discharge here are described in reverse to the general description. In other words, the charge is referred to supply of a current for decreasing a potential of the working electrode until the battery voltage reaches 0 V, and a discharge is referred to supply of a current for increasing the potential of the working electrode until the battery voltage reaches 1 V. Based on the initial charge capacity and initial discharge capacity measured as above and a mass and density of the zinc alloy (zinc in Comparative Example 1) being the negative electrode active material included in the negative electrode mixture layer, the initial charge capacity density, the initial discharge capacity density, and the initial efficiency were calculated to be evaluated with the following formulae.

Initial Charge Capacity Density $(mAh/cm^3)$=Initial Charge Capacity (mAh)/Mass of Zinc Alloy Included in Negative Electrode Mixture Layer (g)×Density of Zinc Alloy in Negative Electrode Mixture Layer $(g/cm^3)$ Initial Discharge Capacity Density $(mAh/cm^3)$=Initial Discharge Capacity (mAh)/Mass of Zinc Alloy Included in Negative Electrode Mixture Layer (g)×Density of Zinc Alloy in Negative Electrode Mixture Layer $(g/cm^3)$ Initial Efficiency (%)=Initial Discharge Capacity/Initial Charge Capacity×100

TABLE 1

| | Composition of negative electrode active material | | Initial charge capacity density $(mAh/cm^3)$ | Initial discharge capacity density $(mAh/cm^3)$ | Initial efficiency (%) |
|---|---|---|---|---|---|
| | $M_{Zn}/M_{Mn}$ | Fe content (ppm) | | | |
| Example | 10 | 50 | 2152 | 1851 | 86 |
| Comparative Example | 10 | 0 | 2168 | 1804 | 83 |
| Reference Example 1 | (Zn only) | 0 | 2859 | 1198 | 42 |
| Reference Example 2 | ($M_{Zn}/M_{Ti}$ = 10) | 0 | 1690 | 1077 | 64 |
| Reference Example 3 | ($M_{Zn}/M_{Co}$ = 10) | 0 | 585 | 178 | 30 |
| Reference Example 4 | ($M_{Zn}/M_{Ni}$ = 10) | 0 | 2232 | 1127 | 50 |
| Reference Example 5 | ($M_{Z}/M_{Cu}$ = 10) | 0 | 1255 | 656 | 52 |

As shown in Table 1, the battery of Example had a higher initial efficiency than the battery of Comparative Example. From this result, it has been found that containing a small amount of Fe in the zinc-manganese alloy as the negative electrode active material may increase the initial charge-discharge efficiency of the secondary battery, and may increase the discharge capacity even during and after the second cycle. The batteries of Reference Examples 1 to 5, which used negative electrode active materials other than the zinc-manganese alloy, had much lower initial efficiency than the batteries of Example and Comparative Example.

REFERENCE SINGS LIST

10 Secondary battery
11 Positive electrode
12 Negative electrode
13 Separator
14 Electrode assembly
15 Exterior housing body
16 Sealing assembly
17, 18 Insulating plate
19 Positive electrode lead
20 Negative electrode lead
21 Grooved part
22 Filter
23 Lower vent member
24 Insulating member
25 Upper vent member
26 Cap
26a Opening
27 Gasket

The invention claimed is:

1. A negative electrode active material for a non-aqueous electrolyte secondary battery, including a zinc-manganese alloy containing Zn, Mn, and Fe, wherein
in the zinc-manganese alloy:
a molar ratio of a Zn content to a Mn content is 3 to 13; and
a mass ratio of an Fe content to a total mass of Zn and Mn is 1000 ppm or less.

2. The negative electrode active material for a non-aqueous electrolyte secondary battery according to claim 1, further including a graphite, wherein a proportion of the zinc-manganese alloy based on the number of moles of the graphite is 3 mol % to 30 mol %.

3. A non-aqueous electrolyte secondary battery, comprising:
- a negative electrode including the negative electrode active material for a non-aqueous electrolyte secondary battery according to claim 1;
- a positive electrode; and
- a non-aqueous electrolyte.

\* \* \* \* \*